No. 760,104. PATENTED MAY 17, 1904.
J. CONDE.
MACHINE FOR GLAZING TUBES, &c.
APPLICATION FILED JULY 29, 1903.
NO MODEL. 2 SHEETS—SHEET 1.
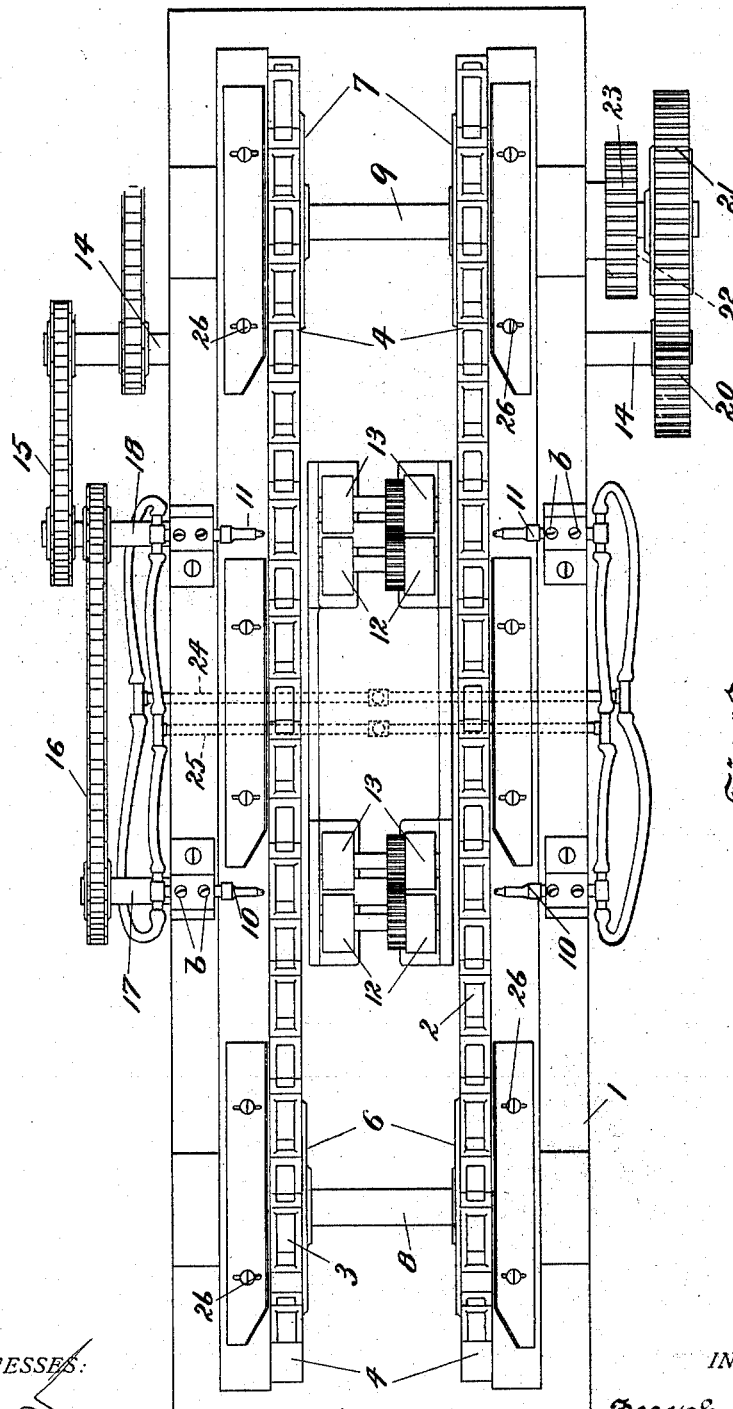
WITNESSES:
INVENTOR.
Joseph Conde.
BY
Augustus D. Houghton
ATTORNEY.

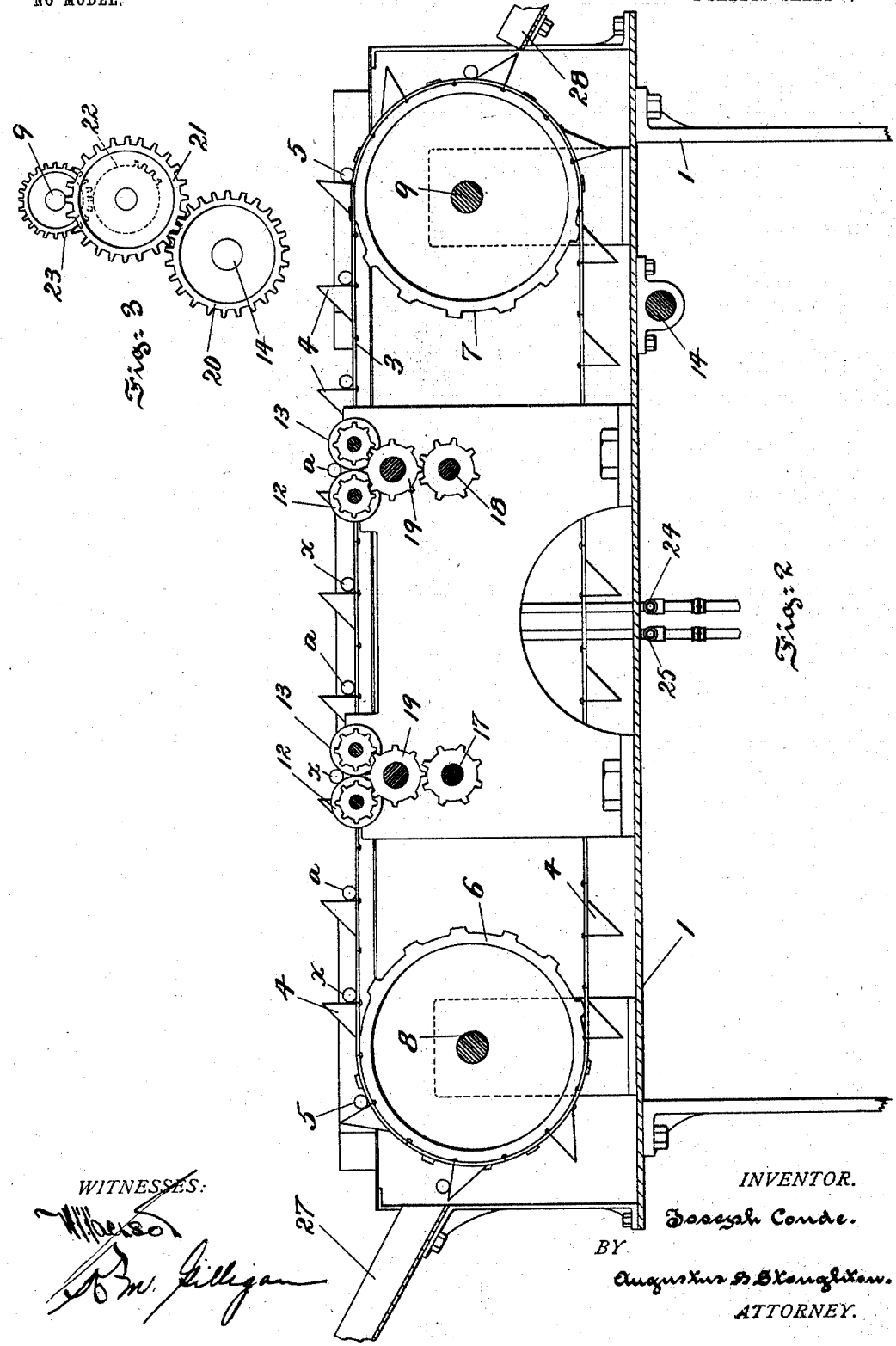

No. 760,104.

Patented May 17, 1904.

UNITED STATES PATENT OFFICE.

JOSEPH CONDE, OF PHILADELPHIA, PENNSYLVANIA, ASSIGNOR OF THREE-FIFTHS TO HENRY C. MARSHALL AND CHARLES B. HALSALL, OF PHILADELPHIA, PENNSYLVANIA.

MACHINE FOR GLAZING TUBES, &c.

SPECIFICATION forming part of Letters Patent No. 760,104, dated May 17, 1904.

Application filed July 29, 1903. Serial No. 167,373. (No model.)

*To all whom it may concern:*

Be it known that I, JOSEPH CONDE, a citizen of the United States, residing at the city of Philadelphia, in the county of Philadelphia and State of Pennsylvania, have invented certain new and useful Improvements in Machines for Glazing Tubes and the Like, of which the following is a specification.

One object of the present invention is to provide a simple, comparatively inexpensive, and reliable machine for rapidly glazing the ends of tubes, especially those of comparatively small diameter or caliber.

Other objects of the invention will appear from the following description; and the invention itself comprises the improvements to be presently described and finally claimed.

The nature, characteristic features, and scope of my invention will be more fully understood from the following description, taken in connection with the accompanying drawings, forming part hereof, and in which—

Figure 1 is a top or plan view of a machine embodying features of the invention. Fig. 2 is a view, principally in central section, of the same looking from the left side of the machine and the top of Sheet 1; and Fig. 3 is a detail elevational view of the gearing shown at the right-hand side of the machine at the rear portion of Fig. 1.

In the drawings, 1 is a bed or frame from which rise suitable brackets for supporting the various shafts.

2 and 3 are endless belts or aprons arranged side by side and with a space between them. These aprons are provided with upwardly-extending carriers 4 for the blanks 5. The aprons run on the wheels 6 and 7, carried by shafts 8 and 9, journaled in the bearings which rise from the frame or bed 1. The burners 10 constitute one set and the burners 11 another set, so that each set comprises a pair of burners, and they are arranged, as shown, transversely and outside of the aprons and opposed to each other. In line with the burners and between the belts or aprons are arranged a pair of revoluble rollers 12 and 13.

14 is a driving-shaft geared, as by chain-gearing 15 and 16, with shafts 17 and 18, carrying toothed wheels which, through the intervention of idlers 19, mesh with toothed wheels on the rollers 12 and 13. Thus the rollers 12 and 13 are rotated, and they are positioned in such a way that the carriers 4 when the belts or aprons are moving cause the blanks 5 to ride up on top of and between the rolls and also cause the blanks to be carried forward through the machine, as will be described. The aprons should pause, so as to permit the blanks to remain on the revoluble rollers during a sufficient time for their ends to be heated by the burners. Means will now be described for imparting such intermittent motion to the aprons. The toothed wheel 20 receives motion from the driving-shaft 14 and meshes with the toothed wheel 21, which is connected with the wheel 22. The latter has a limited number of teeth, and they periodically engage with the wheel 23, fast to the shaft 9.

24 and 25 represent gas and air connections for the burners, and a portion of these may consist of flexible material, so as to permit of adjustment of the burners, as by means of the set-screws *b*. Adjustments for the other portions of the machine are shown at the slot-and-screw connections 26, by which the bevel-ended tube-end guides are connected with the bed or frame.

27 is a chute for delivering blanks to the straight edges of the triangular carriers 4, and 28 is a chute for receiving finished blanks from the inclined edges of the carriers 4.

The mode of operation of the foregoing apparatus may be described as follows: The tubes whose ends are to be finished, or "glazed," as it is called, by subjecting them to the heat of the burner, which is all that is necessary in the case of small tubes for making them smooth, are fed from the chute 27. The straight edges of the carriers receive them and the belts or aprons carry them forward. The motions of the belts or aprons are intermittent, so that alternate blanks are presented to each of the sets of burners, and in this way two blanks always are having their ends heated at once. This is accomplished by causing the belts or aprons to traverse the distance between two carriers after each of its pauses; or, otherwise stated, at each pause one carrier is near each set of rolls, and after the pause the second successive carrier passes the rolls and the third successive carrier stops near the rolls in the place previously occupied by the first carrier. The set of burners and rolls toward the left may be assumed to operate on the blanks marked $x$ and those to the right on blanks marked $a$. Thus a blank marked $x$ is shown as in position in respect to the left-hand rolls and burners. Its ends are exposed to the heat of the burners, and their action, combined with the rotation imparted by the rollers, serves to glaze its ends. At the same time a blank $a$ is in position on the right-hand set of rolls and is being similarly treated. The next motion of the apron causes the blank $a$ to the left to ride over the rolls to the left and a blank $x$ to be placed thereon. Similarly the finished blank $x$ to the left of the right-hand rolls rides over the latter before the blank $a$, which previously rode rapidly over the left-hand set of rolls, is positioned on and treated by the right-hand set.

It will be obvious to those skilled in the art to which my invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A machine for simultaneously glazing the ends of a plurality of tubes or blanks which comprises an apron provided with carriers for the blanks, sets of pairs of opposing burners, and means for intermittently shifting the apron to present alternate blanks to each of the sets of burners, substantially as described.

2. In a machine for glazing both ends of tubes the combination of endless belts having a space between them and provided with carriers for the blanks, means for intermittently driving the belts, a pair of opposing burners arranged with the belts between them, revoluble rolls located between the opposing burners and between the belts or carriers and adapted to receive the blanks, and means for positively revolving said rolls in the same direction, substantially as described.

3. In a machine for glazing both ends of tubes the combination of a pair of belts or aprons having a space between them, means for actuating the belts, triangular carriers extending outward from the belts or aprons, a pair of rolls arranged between the belts or aprons, a pair of opposing burners arranged outside of the aprons and in line with the rolls, and means for positively revolving the rolls in the same direction, substantially as described.

4. A machine for glazing tubes or blanks which comprises an apron having carriers, means for intermittently driving the apron, rolls onto which the apron feeds the blanks, means for positively revolving said rolls in the same direction and thereby revolving the tubes or blanks, and opposing burners for heating the ends of the rotating tubes or blanks, substantially as described.

5. The combination of rolls arranged adjacent to each other and adapted to support a blank or tube in rolling contact above and between them, a burner for heating the rotating blank or tube, and means for positively driving said rolls in the same direction, substantially as described.

In testimony whereof I have hereunto signed my name.

JOSEPH CONDE.

In presence of—
W. J. JACKSON,
FRANK E. FRENCH.